United States Patent [19]
Pichat

[11] Patent Number: 5,124,048
[45] Date of Patent: Jun. 23, 1992

[54] TREATMENT OF WASTE AND RESIDUE CONTAINING SODIUM AND POTASSIUM IONS

[76] Inventor: Philippe Pichat, 18 rue des Tournelles, 75004 Paris, France

[21] Appl. No.: 769,661

[22] Filed: Oct. 2, 1991

[30] Foreign Application Priority Data

Oct. 2, 1990 [FR] France .................. 90 12098

[51] Int. Cl.$^5$ .................................. C02F 1/58
[52] U.S. Cl. ........................ 210/711; 210/738
[58] Field of Search ........... 210/711, 712, 738, 767; 423/323

[56] References Cited

U.S. PATENT DOCUMENTS 4,514,366 4/1985 Barber .

FOREIGN PATENT DOCUMENTS 0255629 7/1987 European Pat. Off. .

OTHER PUBLICATIONS

Chemical Abstracts, vol. 92, No. 18, May 5, 1980, Columbus, Ohio, Kalach V. S. et al.: "Potassium flurosilicate" p. 157; colonne de droite; ref. No. 149396R *abrege*.

Chemical Abstracts, vol. 101, No. 10, Sep. 3, 1984, Columbus, Ohio; Garkun V. K. et al.: "Sodium flurosilicate", p. 145; colonne de droite; ref. No. 752627 *abrege*.

*Primary Examiner*—Frank Spear
*Attorney, Agent, or Firm*—Browdy and Neimark

[57] ABSTRACT

The invention concerns a process for lowering or eliminating the sodium and potassium ion content in various forms of waste. According to the process, waste is treated with the residue, itself regarded as a pollutant since rich in fluosilicic acid, discharged from the manufacture of sulfuric acid on a calcic ore based on calcium phosphate.

5 Claims, No Drawings

TREATMENT OF WASTE AND RESIDUE CONTAINING SODIUM AND POTASSIUM IONS

FIELD OF THE INVENTION

The present invention refers to the field of chemical treatment of residue and waste discharged from industry or the like, containing sodium and potassium ions in any form. The invention concerns more particularly a process capable of eliminating or reducing the amount of said ions in the waste products.

DESCRIPTION OF THE PRIOR ART

It is known that numerous kinds of waste, particularly from industrial plants, as well as residue from the manufacture of various chemical products, contain alkaline ions such as sodium and potassium in non negligible and sometimes substantial proportions. This is particularly the case residue from alkaline baths intended for various industrial processes such as the cleaning of metals, sheet metals or other metallic articles. Also for numerous types of acid waste, which must be treated with alcalino-earthy carbonates or hydroxides in order to obtain the precipitation of heavy metal salts (such as for example chromium, nickel, etc. ...)and which contain Na+ and/or K+ ions since these treatments have no effect on alkaline ions. One can also mention, as non limitative examples, surface treatment processes using metallic cyanides (Cu, Ni, Zn, Cd, Cr ...) dissolved in an excess of alkaline cyanides, and in which it is necessary to eliminate the cyanides at the end of the process. This step generally consists of treatment with a strong acid such as $H_2S_O4$ according to the simplified equation:

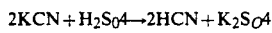

$$2KCN + H_2S_O4 \rightarrow 2HCN + K_2S_O4$$

The reaction is not complete however when KCN is replaced by a complex cyanide and the residue still contains K+ and Na+ ions.

The presence of alkaline ions in waste represents a serious drawback during the final treatment used to eliminate them from this waste. For example the presence of alkaline products causes deterioration in the silico-refractories in the incineration ovens and the formation of alkaline salt rings on the walls of these ovens. In the same way, the treatment of waste containing more that b 15 g/l of alkaline ions by the technique known as "Evapo-Incineration" (Trademark pending) rapidly fouls the treatment apparatus. It is therefore important to carry out a pre-treatment of waste and residue before their transfer to the so-called "Evapo-Incineration" process.

Moreover, it is known that, due to the presence of calcium fluoride and silica in the ore used as a raw material, the manufacture of phosphoric acid by the humid method e.g. the treatment of calcium phosphate or phosphorous ore with sulfuric acid, entails the production of fluosilicic acid ($H_2SiF_6$) or of a product containing this substance. A certain percentage of this fluosilicic acid is recovered for use in the chemical industry, when the phosphoric acid content is very slight (generally lower than 50 parts per million, ppm). However, a significant proportion of this acid, containing more than 50 ppm and often from 500 to 600 ppm of $H_3PO_4$, is evacuated to the environment after neutralisation. This type of waste will hereafter be designated by the term "WPAM" (Waste from Phosphoric Acid Manufacture).

SUMMARY OF THE INVENTION

It has, surprisingly, now been found possible, before treatment by the physico-chemical process of neutralisation, to advantageously use this residue WPAM in order to eliminate or separate alkaline ions of the Na+ and/or K+ types from industrial or other waste as defined above.

In practice, it is sufficient to mix the alkaline waste to be treated with the residue WPAM, by stirring at room temperature or under mild heating. The quantity to be used of each product depends upon the type of waste involved, but preliminary analysis and calculation must be carried out to ensure that a maximum ration of the equivalent of one mole of $SiF_6H_2$ to the equivalent of two moles of alkaline ions (Na+, K+ or a combination of these ions) is not exceeded. The salts which precipitate in the mixture are separated from the treated waste by standard decanting, centrifuging and/or filtration operations and are then discharged or solidified by the known process.

The process according to the invention can be used in the treatment of all types of alkaline waste, in liquid or solid form and of a neutral, basic or acid nature.

Moreover, it has been found possible in some cases to substitute WPAM for strong acids, for example to acidify the cyanide medium of the surface treatment mentioned above. In this case, the sodium or potassium fluosilicate is precipitated and the waste, freed of cyanide, can be used to neutralise the sodium or potassium contained in another waste, since it contains an excess of WPAM.

DESCRIPTION OF A PREFERRED EMBODIMENT

By way of example, waste contianing 96.1 g/l of Na, 1 g/l of K, 130 mg/l of phenol and 11000 mg/l of TOC (Total Oxidisable Carbon) was used. 80 g of WPAM was added to 100 g of this waste by stirring at room temperature. After precipitation of the fluosilicates, only 6.53 g/l of Na and traces of potassium remained. In an experiment where 99 g of WPAM were used, the final solution contained only 1.2 g/l of Na+ ions. On this occasion, it was established that the treatment according to the present invention caused a considerable reduction in the phenol content, which dropped to only 42 mg/l, and in the OCR (Oxygen Chemical Request), which dropped from $8 \times 10^5$ to $1.5 \times 10^5$.

What is claimed is:

1. A process for lowering the sodium and potassium ion content in waste containing such ions, whether produced by an industrial plant or by any other source, characterised in that the waste containing these ions is treated by the residue, itself considered a pollutant since rich in fluosilicic acid, discharged from the manufacture of phosphoric acid by the action of sulfuric acid on a on a calcic ore containing calcium phosphate.

2. A process according to claim 1, wherein the treatment is performed under conditions such that the equivalent of one mole of fluosilicic acid reacts upon the equivalent of two moles of alkaline ions selected from the group consisting of Na+, K+ or both.

3. A process according to claim 1, wherein the treatment comprises the mixture of said waste and said residue by stirring at room temperature.

4. A process according to claim 1, wherein the alkaline salt which precipitates after treatment is separated from the waste by standard decanting, centrifuging or filtration operations and is then discharged.

5. Application of the process according to claim 1 for the pre-treatment before incineration of neutral, acid or basic waste rich in K+ and Na+ ions, whether in liquid or in solid form.

* * * * *